United States Patent [19]

Nagano et al.

[11] 4,355,054
[45] Oct. 19, 1982

[54] PROCESS FOR PRODUCTION OF A LOW HYDROGEN TYPE COVERED ARC-ELECTRODE

[75] Inventors: Kyoichi Nagano, Kamakura; Toshihiko Takami, Ebina; Kunio Koyama, Machida, all of Japan

[73] Assignee: Nippon Steel Corporation, Tokyo, Japan

[21] Appl. No.: 230,795

[22] Filed: Feb. 2, 1981

[30] Foreign Application Priority Data

Feb. 2, 1980 [JP] Japan .................................. 55/11738

[51] Int. Cl.$^3$ .............................................. B05D 5/12
[52] U.S. Cl. .................................... 427/61; 427/59; 427/126.2; 427/126.3; 427/126.4; 427/376.2; 427/376.4; 427/376.5; 427/380; 427/397.8
[58] Field of Search ............... 427/59, 61, 123, 126.2, 427/126.3, 377, 379, 376.2, 376.3, 376.4, 376.5, 397.8, 380, 126.4

[56] References Cited

U.S. PATENT DOCUMENTS

| | | | |
|---|---|---|---|
| 2,686,134 | 10/1954 | Yeadon | 427/59 |
| 2,697,159 | 12/1954 | Donahey | 427/59 |
| 3,560,273 | 2/1971 | Peterson | 427/61 |
| 3,694,259 | 9/1972 | Chapman | 427/59 |
| 3,783,020 | 1/1974 | Kimura et al. | 427/61 |

*Primary Examiner*—Michael R. Lusignan
*Assistant Examiner*—Richard Bueker
*Attorney, Agent, or Firm*—Cushman, Darby & Cushman

[57] ABSTRACT

In a low hydrogen type covered arc-electrode, the sources of diffusible hydrogen are kept to a low level by selecting kind of the ingredients for producing the electrodes or by baking the ingredients. In the process of the present invention, the covered arc-electrode is baked at a high temperature so as to extremely reduce the amount of the sources of diffusible hydrogen of the weld metal, while decomposition of limestone, which is one of the covering components, is prevented due to a novel baking atmosphere containing $CO_2$. The weight ratio of $Na_2O/K_2O$ in the covering is adjusted to be 1 or more, so as to keep amount of fumes.

5 Claims, 3 Drawing Figures

PROCESS FOR PRODUCTION OF A LOW HYDROGEN TYPE COVERED ARC-ELECTRODE

The present invention relates to a process for the production of a low hydrogen type covered arc-electrode. More particularly, the present invention relates to a process for the production of a low hydrogen type covered arc-electrode suitable for obtaining weld metal excellent in the cracking resistance in welding of structural steels.

As a means for preventing weld cracking in the welding of steel structures, there has been adopted, for example, a welding process, in which welding consumables excellent in cracking resistance are used, and a process, in which preheating is carried out in the welding operation.

For example, in case of 50 kg/mm$^2$ high tensile steel plates having a thickness of at least 25 mm, a low hydrogen type electrode is used for welding and preheating of the steel plates is carried out at 75° to 150° C. according to the restraint degree and condition of the atmosphere.

The preheating operation conducted in the welding process is troublesome, requires fuel expenses and is complicated, and therefore, the welding cost is increased and hence the preheating operation is economically disadvantageous. Accordingly, development of an electrode having an excellent cracking resistance and allowing to eliminate the necessity of preheating has eagerly been desired in the art.

In order to obtain a covered arc-electrode having such an excellent cracking resistance that cracking will not be caused even if extra thick steel plates are welded without preheating, it is an indispensable requirement that the amount of diffusible hydrogen in the resulting weld metal should be very small. The main sources of diffusible hydrogen in the weld metal are water contained in the atmosphere, which is dissociated under the arc to form hydrogen to be intruded in the weld metal, and water and hydrogen contained in or adhering to both steels to be welded and the covering arc-electrode.

Many experiments have heretofore been made to reduce the hydrogen source contained in or adhering to a covered arc-electrode. For example, there can be mentioned a process in which the moisture absorption resistance of covered arc-electrodes is increased as disclosed in Japanese Patent Publication No. 34485/73, and a process, in which a covering is subjected to various treatments for imparting a high moisture absorption resistance to the covering. Some of these processes are now practised in the art. However, by passive means of reducing the moisture-absorbing property in a covered arc-electrode according to such a process, it is almost impossible to reduce the content of diffusible hydrogen in the weld metal to such an extent that cracking can be prevented without preheating. It is, therefore, necessary to extremely reduce the amount of hydrogen sources contained in all the ingredients used for the production of the covered arc-electrode to very low levels.

In welding of weld structures, where occurrence of cracking in the weld must completely be prevented, strict controls of the re-drying or storage are required for preventing electrodes from absorbing the moisture. Therefore, rather than the improvement of the moisture absorption resistance, the prominent reduction of hydrogen sources contained in the electrode is required for the electrode so as to attain a substantial effect of reducing the hydrogen content of the resulting weld metal.

If ingredients of the covering having a low hydrogen source content or ingredients, which have been preliminarily baked are used, the amounts of hydrogen sources contained in the covering of an electrode can be reduced. However, if a covering comprised of ingredients having a low water content is used, the coating property of the covering materials is poor and the productivity of the electrode is decreased.

Furthermore, even if of the covering having a low hydrogen source content are used, since these ingredients are brought into contact with water added at the process of kneading the ingredients with a binder, these ingredients react with water released at the preliminary drying process and such water may be absorbed into the covering as the water source.

When an electrode is dried at a high temperature in the air to effect dehydration, limestone contained in a large amount in the covering of a low hydrogen type electrode is decomposed at the drying process. The CaO formed as a result of the reaction expressed by $CaCO_3 \rightarrow CaO + CO_2$ is highly reactive to moisture and thus absorbs the moisture contained in the atmosphere during the baking process and the cooling process after the baking, with the result that a reduction in the moisture content becomes impossible. Therefore, a sufficient reduction of the hydrogen content cannot be attained by the drying in the air, because the dehydration temperature in the air is limited because of decomposition of the limestone.

A low hydrogen type covered arc electrode comprises a core wire comprised of mild steel or an alloy steel and a covering comprising a carbonate and a fluoride, as well as a slag-forming agent, ferroalloy, iron powder, a lubricant, a binder, etc., which are mixed with each other and coated on the core wire. The ingredients of the low hydrogen type covered arc-electrode contain hydrogen sources more or less. More specifically, metals such as the core wire, ferroalloy and iron powder contain hydrogen in the atomic form, while the carbonate, fluoride, slag-forming agent, lubricant and binder contain water in the state of adsorption, water of crystallization, a hydroxyl group and OH groups present in the chemical structures of respective components.

It is known that among these hydrogen sources, adsorption water which is merely physically bonded to the components of the covering, water of crystallization and hydroxyl groups are substantially removed from the covering only by heating at high temperatures unless under an extremely high water vapor pressure. Accordingly, reduction of the hydrogen content in the electrode has been accomplished only by heating and drying in an ordinary atmosphere.

In case of a low hydrogen type electrode containing a carbonate, a fluoride, a slag-forming agent, a lubricant and a binder, however, there is present an OH component which is chemically bonded more strongly than the hydroxyl group in a hydroxide. This OH component is different from the hydroxyl group in the hydroxide in the point where the OH component is not released by merely heating to a temperature of 400° C. carried out as in a conventional baking of the covered arc-electrodes. In other words, this OH component is released at a very high temperature, such as under an arc or in an atmosphere having an appropriate oxygen potential. Specifically, a water glass composed of sodium silicate, potassium silicate and the like, and usually used as the binder, maintains its gel structure when heated to a temperature up to 500° C., and thus a large amount of the OH component is kept contained in the water glass at such a heating temperature. When the water glass is heated to a temperature of higher than 500° C., its gel structure is destroyed but the OH component, which is strongly bonded in the water glass, still remains in the water glass.

In the experiments conducted by the present inventors, coverings of a conventional low hydrogen type covered-arc electrode containing limestone ($CaCO_3$) and fluorite ($CaF_2$) were coated using water glass and then heated in an atmosphere of varied oxygen potential and varied partial pressure of moisture. The relationship between the amount of the residual OH component and the minerals formed in the resultant covering was investigated in these tests. The following facts were discovered as a result of the investigation. When the water glass is heated to a temperature of 500° C. or higher in an atmosphere having the oxygen potential corresponding to air containing 2% or more of carbon dioxide gas, the reaction between $SiO_2$ contained in the water glass gel and limestone and fluorite contained in the slag-forming agent takes place, and its reaction can be expressed by the following equation.

$$2SiO_2 + 3CaCO_3 + CaF_2 \rightarrow 3CaO\ CaF_2\ 2SiO_2 + 3CO_2$$

The formation of Cuspidine ($3CaO\ CaF_2\ 2SiO_2$), is promoted while the gel structure is destroyed. When the reaction mentioned above proceeds, the OH component, which is strongly bonded in the water glass, is released out of the system of the reaction. The content of this OH component is also influenced by the moisture content and temperature in the atmosphere during the baking process of electrode, and the following relationship is established:

$$(OH) = C \times \sqrt{P_{H_2O}}$$

wherein (OH) stands for the content of the OH component in the electrode, C is the constant of proportion and $P_{H_2O}$ stands for the partial water vapor pressure in the atmosphere.

The OH component contained in the electrode at a content satisfying this relation is substantially released when exposed to an arc at the welding process and it is converted to a diffusible hydrogen in the weld metal. Therefore, it is indispensable that the content of this OH component should be as low as possible. It is, therefore, indispensable that also the water vapor partial pressure in the atmosphere during the baking process should be as low as possible.

The prior art and present invention is hereinafter explained with reference to the following drawings.

Figure 1:
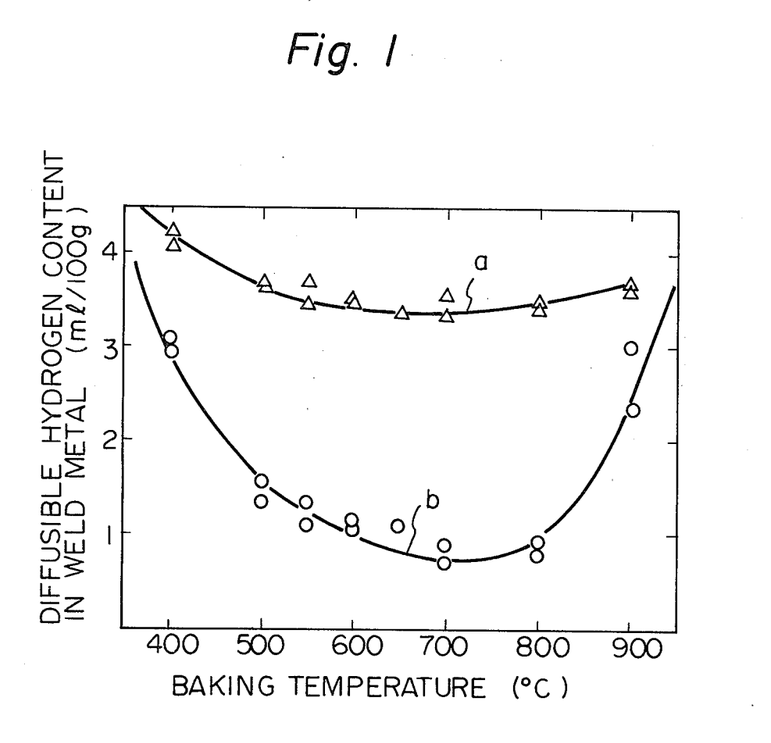
FIG. 1 is a graph illustrating the relation between the diffusible hydrogen content in the weld metal and the baking temperature.

FIG. 1 shows a diffusible hydrogen content in a weld metal obtained, by the experiments of the present inventors when a low hydrogen type covered arc-electrode corresponding to the electrode D-5016 according to JIS Z 3212 is baked for 1 hour at a temperature of 400° to 900° C. in an atmosphere containing 0.03% (a in FIG. 1) or 36% (b in FIG. 1) of carbon dioxide gas and having a dew point of −27° C. and then welding is carried out at an ambient temperature of 20° C. and under a relative humidity of 60%.

From FIG. 1, it is seen that the content of diffusible hydrogen is drastically reduced if baking is carried out at 500° to 800° C. in an atmosphere containing 36% of carbon dioxide gas and having a dew point of −27° C. Incidentally, the content of diffusible hydrogen referred to in the present specification are values determined according to the diffusible hydrogen test method of IIW using mercury as a hydrogen displacement medium.

Figure 2:
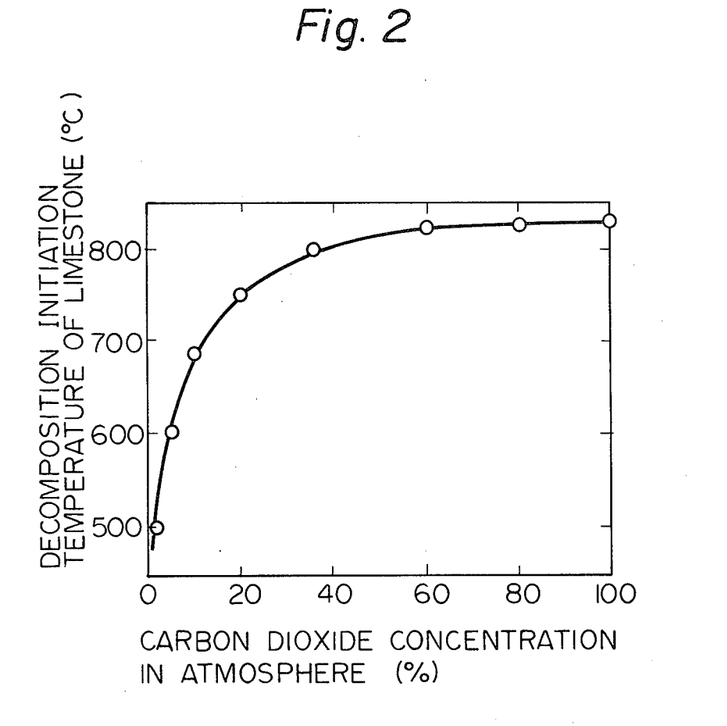
FIG. 2 is a graph illustrating the relation between the temperature of initiation of decomposition of limestone in the covering and the carbon dioxide gas concentration in the atmosphere.

FIG. 2 shows the results of measurement by the present inventors using a thermobalance of the temperature, where decomposition of limestone contained in the covering initiates, under the condition that the electrode similar to that mentioned above with reference to FIG. 1 is heated at a rate of 15° C./min in an argon atmosphere containing carbon dioxide at various concentrations.

When the electrode is heated at 500° C., the atmosphere should contain at least 2% of carbon dioxide gas so as to prevent decomposition of limestone in the covering. Furthermore, in an atmosphere containing 36% of carbon dioxide gas, the carbonate is not decomposed even at 800° C. but is kept present in the covering, and therefore, deterioration of the usability and insufficient shielding of an arc column can be prevented.

From the results shown in FIGS. 1 and 2, it is seen that, when an electrode is baked for 1 hour at a temperature of from 500° to 800° C. in a carbon dioxide gas-containing atmosphere having a low dew point, the content of the OH component as the hydrogen sorce in the electrode is reduced and, further limestone in the covering is not decomposed. Therefore, the amount of diffusible hydrogen in a metal welded by using this electrode can be remarkably decreased.

Generally speaking, a low hydrogen type covered arc-electrode allows the amount of diffusible hydrogen in the weld metal lower and the toughness of the weld metal better than in case of other type covered arc-electrodes. Although the weld metal obtained by using the low hydrogen type covered arc-electrode has excellent properties, it is known that, fumes are readily formed during the welding operation and the atmosphere of the welding shop is drastically contaminated at the welding using the low hydrogen type covered arc-electrode. As means for eliminating bad influences of such fumes, there have been adopted a method, in which an operator wears a mask, and a method, in which an exhausting device is attached to a welding shop. However, these methods are troublesome and are disadvantageous from the economical viewpoint. Accordingly, it is eagerly desired to control formation of fumes from a covered arc-electrode as a fume source as well as to reduce the hydrogen content of the covered arc-electrode.

Ordinarily, a covered arc-electrode contains Na and K in the form of $Na_2SiO_3$ and $K_2SiO_3$, respectively, mainly as an inorganic binder and also contains Na and K in the form of fluorides, sillicofluorides and carbonates as slag-forming agent or an arc stabilizer. Na and K are also contained in the covered arc-electrode in the form of potash feldspar, cryolite and potassium titanate. The mixing ratio of Na to K influences the arc stability, the welding operation, the drying speed of the covering in the electrode-preparing process and the strength of the covering. Accordingly, this mixing ratio is determined so that these factors are maintained at optimum levels. Furthermore, the presence of compounds of Na and K in the covering influences the quantity of fumes formed.

Accordingly, the present inventors prepared various low hydrogen type covered arc-electrodes, containing Na and K in the form of the above mentioned inorganic binder and other various forms of the Na-,K-containing materials at various $Na_2O/K_2O$ weight ratios, which corresponded to the product of D-5016 according to JIS Z 3212, and the relation between the $Na_2O/K_2O$ weight ratio and the quantity of fumes formed was examined. The results of the examination is shown in FIG. 3, wherein the ordinate indicates the quantity (g) of fumes formed when 1 kg of an electrode is consumed.

Figure 3:
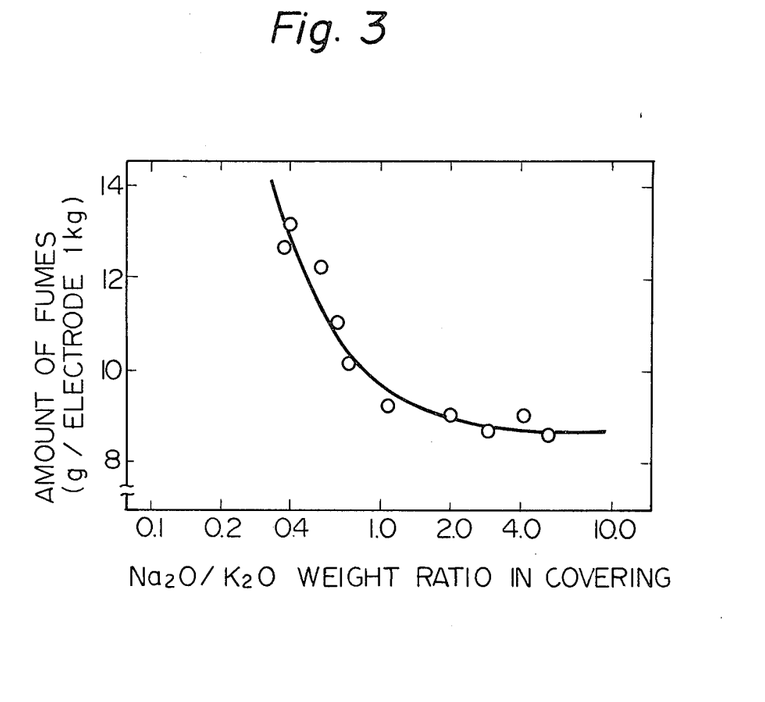
FIG. 3 is a graph illustrating the relation between the $Na_2O/K_2O$ weight ratio in the covering of the covered arc electrode and the quantity of fumes formed in the arc.

As is seen from FIG. 3, when the $Na_2O/K_2O$ weight ratio in the covering is 1 or higher, the quantity of fumes formed per 1 kg consumption of the covered arc electrode, is drastically reduced.

In case of the conventional electrode-preparing method, however, as the above-mentioned weight ratio is increased, also the content of OH component in the covering is increased, resulting in an increase of the content of diffusible hydrogen. The present inventors found that if this increase of the $Na_2O/K_2O$ weight ratio is combined with high temperature baking, the content of the OH component in the covering can be maintained at a low level inspite of an increase of the $Na_2O/K_2O$ weight ratio and there can be obtained a low hydrogen type electrode with small amount of fumes.

In case of the field welding of penstocks, the welding operation is often carried out in a high-temperature high-humidity environment. The low hydrogen type covered arc-electrode to be used in such environment should desirably have a high moisture absorption resistance. In the light of this desire, the present inventors prepared low hydrogen type covered arc-electrodes corresponding to the product of D-5016 according to JIS Z 3212 by adding lithium hydroxide to water glass used as the binder in an amount corresponding to a lithium concentration of 0.05% based on the weight of the covering and then by baking the covering for 1 hour at 350°, 500°, 650° or 800° C. in an atmosphere having various contents of the carbon dioxide, and then the moisture absorption of these electrodes and the diffusible hydrogen contents in weld metals formed by using these electrodes were determined. The water absorption was determined based on the increase of the weight observed when the electrode was allowed to stand for 4 hours at a temperature of 35° C. and under a relative humidity of 90%. From the results of these experiments, it is seen that, when lithium is added to the binder, the moisture absorption is reduced and also the diffusible hydrogen content is simultaneously reduced as compared with the moisture absorption attained when lithium is not added. This effect is especially prominent when baking was carried out at a high temperature exceeding 500° C.

It has been confirmed that, when lithium silicate or lithium formate was added instead of lithium hydroxide, or when lithium fluoride was added as a slag-forming agent to the covering, the moisture absorption and the diffusible hydrogen content were similarly reduced as in the case of adding lithium hydroxide.

It has thus been discovered that: when lithium is added to the covering, the moisture absorption resistance of the electrode is improved, and; when high temperature baking is carried out in a carbon dioxide gas-containing atmosphere in addition to the incorporation of lithium, the hydrogen sources contained in the electrode can completely be removed and the effect of improving the moisture absorption resistance by lithium can further be enhanced, with the result that a covered arc-electrode having a low hydrogen content and an excellent moisture absorption resistance can be provided. The present inventors have now completed the invention based on these discoveries.

It is an object of the present invention to provide a process for producing a low hydrogen type covered arc-electrode, so that a harmful source of diffusible hydrogen can be removed from the covering, without causing the decomposition of limestone in the covering.

It is another object of the present invention to provide a process for producing a low hydrogen type covered arc-electrode, so that, the amount of diffusible hydrogen in the weld metal can be decreased without preheating of a workpiece, to such a level that weld cracks do not occur.

In accordance with the fundamental aspect of the present invention, there is provided a process for the production of a low hydrogen type covered arc-electrode, which comprises coating on a core wire a covering which contains $Na_2O$ and $K_2O$ at an $Na_2O/K_2O$ weight ratio of at least 1, and which may further contain a lithium compound in an amount of 0.005 to 0.4% in terms of lithium, and baking the covering at a temperature of from 500° to 800° C. in an atmosphere containing at least 2% of carbon dioxide and having a dew point of not more than 5° C.

The present invention will now be described in detail.

As is seen from the above-mentioned FIG. 3, if the $Na_2O/K_2O$ weight ratio in the covering is lower than 1, the amount of fumes formed during arc welding is high. Therefore, in order to suppress the formation of fumes, it is indispensable that the $Na_2O/K_2O$ weight ratio should be at least 1. Incidentally, the amounts of $Na_2O$ and $K_2O$ referred to in the present specification are the amounts of all Na and K contained in the form of compounds and impurities as calculated as the amounts of $Na_2O$ and $K_2O$.

In order to obtain a sufficient strength of the covering and to stabilize the arc, the total amount of $Na_2O$ and $K_2O$ is preferably at least 1.5%. However, if this total amount exceeds 6.5%, the usability is impaired and the amount of fumes formed during welding is increased. Accordingly, the total amount of $Na_2O$ and $K_2O$ is preferably not larger than 6.5%. In order to obtain a sufficient strength of the covering and to stabilize the arc, $Na_2O$ should be incorporated in an amount of at least 0.8%, but if the amount of $Na_2O$ exceeds 6.0%, the arc becomes unstable. Accordingly, the amount of $Na_2O$ in preferably from 0.8 to 6.0%. If the amount of $K_2O$ exceeds 3.0%, the surface of the electrode is readily cracked at the drying process in the preparation of the electrode. Accordingly, the amount of $K_2O$ is preferably not larger than 3.0%.

Carbon dioxide gas in the atmosphere used for the dehydrogenating treatment provides the baking atmosphere of covering with an oxygen potential most suitable for expelling the OH component which is chemically bonded strongly in the covering. Even if a small amount of oxygen is incorporated in an inert gas such as argon, an oxygen potential similar to that of carbon dioxide gas is obtained, but in this case, decomposition of the carbonate cannot be prevented, as described hereinbelow. Furthermore, although an oxygen potential similar to that of the carbon dioxide containing gas can be obtained by a mixture of nitrogen and oxygen, as in case of the mixing argon and oxygen, decomposition of the carbonate cannot be prevented. Furthermore, nitrogen reacts with ferroalloy and deoxidizing agent in the covering to form nitrides, with the result that the nitrogen concentration in the weld metal is increased and the toughness of the weld metal is deteriorated. Accordingly, the use of such mixture of nitrogen and oxygen is not preferred.

Decomposition of limestone, which is mainly used as the carbonate of the covering of the low hydrogen type arc-electrode, is influenced by the carbon dioxide concentration in the baking atmosphere and the baking temperature. When decomposition of limestone takes place, calcium oxide is formed and react with the moisture in the air to form calcium hydroxide which acts as a hydrogen source at the arc welding. Furthermore, the decomposition of the carbonate causes reduction in the strength of the electrode covering and increase in the falling-off rate of the covering. Moreover, the amount of carbon dioxide gas formed at the arc welding becomes so low that the usability and the shielding effect of the arc are deteriorated, with the result that absorption of moisture, oxygen and nitrogen from the environmental atmosphere of the welding to the weld metal cannot be prevented.

As is seen from FIG. 2, in order to prevent decomposition of the carbonate during baking at a temperature not lower than 500° C., the baking atmosphere of electrodes should contain at least 2% of carbon dioxide gas. Generally speaking, the elementary Na and K are liable to be bonded with water, and the elementary Na and K in the water glass are located in the water glass structure at such positions liable to be bonded with water. Therefore, due to the baking in an atmosphere containing 2% or more of carbon dioxide, the elementary Na and K in the water glass are preferentially bonded with the carbon dioxide which expells the moisture already bonded in the water glass or which impedes the re-bonding of the moisture with water glass. Accordingly, the baking in the atmosphere mentioned above is effective for the hydrogen content reduction and enhancement of the resistance against the moisture absorption in the production of covered arc-electrodes. An atmosphere having a higher carbon dioxide concentration than 2% is necessary for prevention of decomposition of limestone at a higher baking temperature than 500° C. Therefore, the carbon dioxide gas concentration should appropriately be changed according to the baking temperature. When the baking temperature is lower than 500° C., even in a carbon dioxide gas-containing atmosphere having a dew point lower than 5° C., the removal speed of the OH component from the electrode covering is so low that it is impossible to reduce the diffusible hydrogen content to a level not causing cracking without preheating of the steel to be welded. When the baking is carried out at a temperature higher than 800° C., the OH component in the electrode covering is substantially removed in a short time. However, even in the carbon dioxide-containing gas, the carbonate in the covering is decomposed and hence the shielding effect of the arc is impaired, with the result that: hydrogen and the like are intruded into the arc from the atmosphere at the welding; the fall-off rate of the covering is increased; the arc stability is degraded, and; the usability is decreased. Furthermore, oxidation of ferroalloy and the deoxidizing agent becomes violent. For the reasons set forth above, the dehydrogenating treatment is carried out at a temperature of from 500° to 800° C. Preferable dehydrogenating temperature is from 500° to 600° C.

The content of the OH component in the covering is in direct proportion to the square root of the water vapor partial pressure. Accordingly, in order to reduce the diffusible hydrogen content by reducing the content of the OH component in the covering, it is preferred that the water vapor partial pressure in the baking atmosphere be controlled to a level as low as possible. However, from an industrial and economical view points, reduction of the water vapor partial pressure should be limited. In order to provide a diffusible hydrogen content capable of preventing the formation of cracks in the weld zone without the preheating, the moisture content of the carbon dioxide gas-containing atmosphere should be smaller than the level corresponding to the dew point of 5° C. which is within the industrially and economically applicable limit of dew point for baking.

The presence of hydrogen or hydrocarbon gas in the carbon dioxide gas to be added to the baking atmosphere is not preferred, because the hydrogen sources in the covering are not reduced but they are sometimes increased.

In the production process of the present invention, the electrode covered by the covering may be preliminarily dried in an ordinary atmosphere. However, the covering of this electrode still contains a considerable amount of water. Accordingly, a satisfactorily dried carbon dioxide gas is introduced into the baking furnace from the outside, and then the baking in the furnace with the atmosphere of the requisite $CO_2$ content must be carried out. Unless the atmosphere in the baking furnace is completely substituted by the atmosphere of the requisite $CO_2$ content, neither the reduction of moisture content in the furnace atmosphere to the level corresponding to the dew point of 5° C., nor the reduction of the content of the OH component in the covering can be attained. When a direct heating type furnace using combustion heat of a fuel as the heat source is applied for baking, the dew point of the atmosphere is not reduced at all because of water contained in the combustion waste gas. Accordingly, an indirect heating type furnace is preferable as the baking furnace. In the process for the production of electrodes according to the present invention, the time necessary for baking is shorter if the baking temperature is higher, and it is ordinarily sufficient if the baking is carried out for 10 minutes to 4 hours. As the heating furnace for the baking operation, either a continuous type heating furnace or a batchwise heating furnace may be used in the present invention. These furnaces are provided with an atmosphere control device capable of maintaining the dew point 5° C. or lower.

In the process according to the present invention, a lithium compound may be incorporated into the covering in an amount of 0.005 to 0.4% in terms of lithium together with the other materials of the covering. If the amount of lithium in the covering is smaller than 0.005%, the electrode, which has been subjected to the dehydrogenating treatment, may tend to absorb the moisture again and hence, the diffusible hydrogen content in the resulting weld metal may not be reduced to a satisfactorily low level. On the other hand, if the amount of lithium in the covering is larger than 0.4%, the arc is not stabilized and the usability is practically poor. Accordingly, in the embodiment where a lithium compound is incorporated into the covering, the amount of lithium is adjusted in the range of from 0.005% to 0.4%. As the lithium compound to be incorporated into the covering and improving the moisture absorption resistance, there can be mentioned LiOH, LiF, lithium salts of organic acids and lithium silicate.

Since the baking is carried out at a temperature of 500° C. to 800° C. in the process the present invention, an organic material frequently contained in the electrode covering at a large amount as an agent for forming an arc-shielding gas is decomposed during the baking operation. Accordingly, the electrode referred to in the present invention is a low hydrogen type covered arc-electrode, in which the covering comprises an inorganic carbonate such as $CaCO_3$, $MgCO_3$, $MnCO_3$, $BaCO_3$ or $SrCO_3$, an inorganic fluoride such as $CaF_2$, $BaF_2$, $MgF_2$, $SrF_2$, NaF or $AlF_3$ and an inorganic oxide such as $SiO_2$, MgO, $TiO_2$, $Al_2O_3$ or $ZrO_2$ as main components in amounts of 0.5 to 60%, respectively.

At the process of coating the covering on a core wire, the above-mentioned respective main components, optionally with a deoxidizing agent, an alloying agent and other additive, such as FeSi, Fe-Ti, FeAl, metallic Mn, Ni, Cr and Fe-Mo, are kneaded with water glass as the binder which is mainly comprised of potassium and sodium silicates. The resulting kneaded mixture is coated around the periphery of the core wire in an amount of 20 to 40% based on the total weight of the electrode by an ordinary electrode coating machine. The covered electrode is heated at 100° to 350° C. to effect preliminary drying and is then baked under the conditions specified in the present invention.

The effects of the present invention will now be described in detail with reference to the following Example.

EXAMPLE

Preparation conditions are shown in Table 1.

Electrodes were prepared under conditions shown in Table 1 by using core wires (4.0 mm in diameter) and coverings shown in Table 2 and also using an ordinary electrode coating machine. These electrodes were subjected to various tests to obtain results shown in Table 3.

Preparation conditions A1 through A4 shown in Table 1 are conditions according to the present invention, and preparation conditions B1 through B5 are comparative conditions.

TABLE 1

|  | Symbol | Kinds of Gases and Composition of Atmosphere | Baking Temperature (°C.) | Dew Point (°C.) of Atmosphere | Baking Time |
|---|---|---|---|---|---|
| Conditions according to the present invention | A1 | 5% $CO_2$ + air | 525 | 3 | 20 minutes |
|  | A2 | 40% $CO_2$ + air | 620 | 0 | 1 hour and 30 minutes |
|  | A3 | 100% $CO_2$ | 780 | 0 | 3 hours and 30 minutes |
|  | A4 | 60% $CO_2$ + air | 650 | 10 | 2 hours |
| Comparative conditions | B1 | 5% $CO_2$ + air | 400 | −10 | 3 hours |
|  | B2 | 1% $CO_2$ + air | 620 | −4 | 30 minutes |
|  | B3 | 100% $CO_2$ | 900 | 3 | 30 minutes |
|  | B4 | 100% air | 600 | 7 | 1 hour |
|  | B5 | Ar + 5% $O_2$ | 600 | −5 | 1 hour and 30 minutes |

Note:
The gas content in the atmosphere is expressed by % by volume

TABLE 2

|  |  | Symbol of Electrode | | | | | | | |
|---|---|---|---|---|---|---|---|---|---|
|  |  | a1 | a2 | a3 | a4 | a5 | a6 | b1 | b2 |
| Composition (%) of Core Wire | C | 0.07 | 0.05 | 0.04 | 0.08 | 0.04 | 0.04 | 0.06 | 0.09 |
|  | Si | 0.01 | 0.02 | 0.01 | 0.06 | 0.03 | 0.05 | 0.02 | 0.05 |
|  | Mn | 0.52 | 0.48 | 0.55 | 1.68 | 1.42 | 1.38 | 0.53 | 1.13 |
|  | Ni | — | — | — | — | — | 2.36 | — | — |
|  | Cr | — | — | — | — | — | 0.21 | — | — |
|  | Mo | — | — | — | — | — | 0.43 | — | — |
| Composition (%) of Covering |  |  |  |  |  |  |  |  |  |
| $Na_2O$ |  | 1.6 | 2.6 | 1.4 | 1.6 | 2.3 | 1.5 | 1.2 | 0.6 |
| $K_2O$ |  | 1.2 | 0.2 | 1.1 | 0.8 | 0.6 | 1.3 | 1.6 | 2.2 |
| Li Compound | LiF | — | — | — | 0.6 | 0.05 | — | — | 2.0 |
|  | LiOH | — | — | 0.05 | — | — | — | — | — |
|  | $Li_2O$ | — | 0.8 | — | — | — | 0.1 | — | — |
| Carbonate | $CaCO_3$ | 49.5 | 46.0 | 32.0 | 46.0 | 44.0 | 52.0 | 48.0 | 45.5 |
|  | $BaCO_3$ | 4.0 | — | 8.0 | 9.5 | 3.0 | — | 3.0 | — |
|  | $SrCO_3$ | — | 4.5 | — | — | — | — | — | 2.5 |
| Fluoride | $CaF_2$ | 14.5 | 12.0 | 10.0 | 10.0 | 14.0 | 13.0 | 12.5 | 11.0 |
|  | $MgF_2$ | — | 1.0 | — | — | — | — | — | — |
| Metallic | Mn | 3.2 | 3.6 | 3.0 | — | 1.4 | 1.3 | 3.0 | 2.3 |
| Deoxidizing | FeSi | 13.0 | 11.5 | 10.5 | 13.0 | 12.5 | 11.8 | 12.0 | 11.5 |
| Agent | FeTi | — | — | 2.5 | — | 2.5 | 1.5 | — | 1.5 |
|  | FeAl | — | 1.5 | — | — | — | 0.5 | 1.5 | 0.5 |
| Ni |  | — | 5.7 | 3.2 | 4.0 | 1.6 | 0.5 | — | 5.8 |
| Cr |  | — | 0.4 | — | 0.4 | — | — | — | 0.5 |
| FeMo |  | — | 1.7 | 1.1 | 1.8 | 1.0 | 0.5 | — | 1.6 |
| Iron Powder |  | 1.3 | — | 11.25 | 1.0 | 4.0 | 1.2 | 1.8 | — |

TABLE 2-continued

|  | Symbol of Electrode | | | | | | | |
|---|---|---|---|---|---|---|---|---|
|  | a1 | a2 | a3 | a4 | a5 | a6 | b1 | b2 |
| TiO$_2$ | 6.0 | 2.0 | 8.3 | 6.0 | 5.05 | 9.0 | 8.0 | 4.0 |
| SiO$_2$ | 5.7 | 6.5 | 7.6 | 5.3 | 8.0 | 5.8 | 7.4 | 8.5 |
| Na$_2$O/K$_2$O Ratio | 1.33 | 13.0 | 1.27 | 2.0 | 3.8 | 1.15 | 0.75 | 0.27 |
| Li Content (%) | 0 | 0.378 | 0.015 | 0.160 | 0.013 | 0.047 | 0 | 0.536 |

Note
(1) Si content in Fe—Si was 42%, Ti content in Fe—Ti was 41%, Al content in Fe—Al was 49%, and Mo content in Fe—Mo was 65%
(2) Symbol "—"means that the component was not added.

TABLE 3

| Symbol of Baking Conditions | Symbol of Electrode | Diffusible Hydrogen Content (ml/100g) | y-Slit Crack Test Critical Preheating Temperature (°C.) | Steel grade | Test for Falling-off of covering | | Moisture Absorption Test | | Formation of Fumes Total Fume | | Usability Test | General Valuation |
|---|---|---|---|---|---|---|---|---|---|---|---|---|
| | | | | | Valuation | Fall-off rate (%) | Valuation | Moisture Absorption rate (%) | Valuation | Amount (mg/g of electrode) | | |
| A1 | | 1.4 | 20 | | O | 4.6 | O | 0.72 | O | 9.0 | O | O |
| A2 | | 0.9 | 0 | | O | 6.2 | O | 0.68 | O | 8.6 | O | O |
| A3 | | 0.7 | 0 | | O | 11.8 | O | 0.65 | O | 8.8 | O | O |
| A4 | | 1.8 | 20 | | O | 5.3 | O | 0.69 | O | 8.9 | O | O |
| B1 | a1 | 5.6 | 125 | HT50 | O | 2.7 | X | 1.13 | O | 9.2 | O | X |
| B2 | | 5.8 | 125 | | X | 43.2 | X | 1.42 | O | 8.8 | X | X |
| B3 | | 5.5 | 125 | | X | 68.2 | X | 1.86 | O | 8.5 | X | X |
| B4 | | 6.7 | 150 | | X | 38.7 | X | 1.42 | O | 8.7 | X | X |
| B5 | | 5.3 | 125 | | X | 54.3 | X | 1.45 | O | 8.4 | X | X |
| A2 | | 1.6 | 20 | | O | 7.5 | O | 0.22 | O | 7.3 | O | O |
| A3 | a2 | 1.1 | 20 | HT80 | O | 15.8 | O | 0.19 | O | 7.0 | O | O |
| A4 | | 2.2 | 20 | | O | 5.8 | O | 0.28 | O | 7.2 | O | O |
| B4 | | 6.4 | 150 | | X | 48.2 | X | 1.21 | O | 6.8 | X | X |
| A3 | a3 | 0.8 | 0 | HT60 | O | 13.6 | O | 0.55 | O | 9.2 | O | O |
| B5 | | 5.6 | 100 | | X | 52.3 | X | 1.33 | O | 8.6 | X | X |
| A1 | | 1.2 | 20 | | O | 5.4 | O | 0.36 | O | 8.0 | O | O |
| A2 | a4 | 0.8 | 20 | HT80 | O | 6.9 | O | 0.34 | O | 7.7 | O | O |
| A4 | | 1.7 | 20 | | O | 5.9 | O | 0.38 | O | 8.1 | O | O |
| B1 | | 5.0 | 100 | | O | 3.6 | X | 0.86 | O | 8.4 | O | X |
| A2 | | 1.4 | 20 | | O | 6.8 | O | 0.59 | O | 8.0 | O | O |
| A3 | a5 | 0.9 | 0 | HT60 | O | 12.8 | O | 0.57 | O | 8.1 | O | O |
| A4 | | 2.3 | 20 | | O | 4.8 | O | 0.62 | O | 8.3 | O | O |
| B2 | | 5.7 | 100 | | O | 6.8 | X | 1.15 | O | 8.3 | X | X |
| A1 | | 1.3 | 20 | | O | 5.3 | O | 0.47 | O | 9.1 | O | O |
| B2 | a6 | 5.6 | 125 | HT80 | X | 49.8 | X | 1.28 | O | 9.0 | X | X |
| B3 | | 5.4 | 125 | | X | 72.5 | X | 1.26 | O | 8.8 | | |
| A1 | | 1.7 | 20 | | O | 5.2 | O | 0.75 | X | 12.5 | O | X |
| A2 | | 1.1 | 0 | | O | 6.5 | O | 0.70 | X | 11.8 | O | X |
| A3 | | 0.8 | 0 | | O | 12.5 | O | 0.63 | X | 11.6 | O | X |
| A4 | | 2.0 | 20 | | O | 5.9 | O | 0.72 | X | 12.3 | O | X |
| B1 | b1 | 5.7 | 125 | HT50 | O | 2.9 | X | 1.15 | X | 13.2 | O | X |
| B2 | | 5.9 | 125 | | X | 53.1 | X | 1.51 | X | 11.7 | X | X |
| B3 | | 5.7 | 125 | | X | 62.8 | X | 1.74 | X | 11.8 | X | X |
| B4 | | 6.5 | 150 | | X | 36.5 | X | 1.38 | X | 11.5 | X | X |
| B5 | | 5.5 | 125 | | X | 43.8 | X | 1.40 | X | 11.2 | X | X |
| A3 | | 1.0 | 20 | | O | 16.5 | O | 0.18 | X | 13.6 | O | X |
| A4 | b2 | 2.2 | 20 | HT80 | O | 6.3 | O | 0.26 | X | 13.2 | O | X |
| B5 | | 5.6 | 125 | | X | 52.3 | X | 0.96 | X | 12.8 | X | X |

Note
(1) The diffusible hydrogen test was carried out at a temperature of 20° C. and under a relative humidity of 60% according to the I.I.W. method (Doc. II-A-275-70).
(2) The y-slit crack test was carried out in an atmosphere maintained at a temperature of 20° C. and a relative humidity of 60% or at a temperature of 0° C. according to the method of JIS Z 3157.
(3) The results of the test for falling-off of covering and moisture absorption test were expressed as follows:
O: good
X: bad
(4) The total fume amount of the electrode was determined according to the method of JIS Z 3930, and the results were expressed as follows:
O: good
X: bad
(5) The results of the usability test were expressed as follows:
O: good
X: bad
(6) In the general valuation, mark "O" indicates good results amd mark "X" indicates bad results.

According to the I.I.W. method, mercury was used as the hydrogen-displacement medium at the diffusible hydrogen test. Both the diffusible hydrogen test and the y-slit crack test were conducted under conditions of a welding current of 170 A (alternating current) and a welding heat input of 17.0 KJ/cm.

At the test for falling-off of covering, 1.5 kg of the electrode was charged in a steel box having a dimension of 65 mm×420 mm×290 mm and rotated at 100 revolutions over a period of 3 minutes, and the falling-off rate of covering can be gained according to the following equation including the electrode weights before and after the test.

$$\text{Falling-off rate of covering} = \frac{\begin{pmatrix}\text{Electrode weight}\\\text{before test, kg}\end{pmatrix} - \begin{pmatrix}\text{Electrode weight}\\\text{after test, kg}\end{pmatrix}}{\begin{pmatrix}\text{Electrode weight}\\\text{before test, kg}\end{pmatrix} \times \begin{pmatrix}\text{Covering}\\\text{Ratio}\end{pmatrix}} \times 100(\%)$$

At the moisture absorption test, the electrode was allowed to stand at a temperature of 35° C. and in a relative humidity of 90%, and the amount of moisture absorped in the covering was reduced to the falling off-rate.

At the y-slit crack test, steel plates of HT 50 were welded by the electrodes a1 and b1, steel plates of HT 60 were welded by the electrodes a3 and a5, and steel plates of HT 80 were welded by the electrodes a2, a4, a6 and b2, and each plate had a thickness of 50 mm. Incidentally, at the y-slit crack test, the electrodes, in which cracking was stopped at 20° or 0° C., were evaluated as being good, at the test for falling-off of the covering, the electrodes, having the falling-off rate smaller than 20%, were evaluated as being good, and at the moisture absorption test, the electrodes, having the moisture absorption rate lower than 0.80%, were evaluated as being good. Furthermore, the electrodes having the total fume amount of less than 10.0 mg/g of the electrodes, were evaluated as being good.

The diffusible hydrogen content in each of the electrodes prepared according to the process of the present invention was much lower than in the electrodes prepared according to the comparative process and was less than 2.5 m/100 g. Furthermore, at the y-slit crack test, the cracking was stopped at 20° or 0° C. in each of the electrodes prepared according to the process of the present invention. In contrast, the cracking stopped when the temperature was 100° C. or higher in each of the electrodes prepared according to the comparative process.

Under the preparation conditions B1, the $CO_2$-containing atmosphere had a low dew point, the baking time was long, but the baking temperature was low. Therefore, the falling-off rate and the usability were good, but the diffusible hydrogen content and moisture absorption rate were high.

Under the preparation conditions B2, the $CO_2$-containing atmosphere had a low dew point, and the baking temperature was appropriate, but the $CO_2$ concentration was insufficient. Therefore, the carbonate was decomposed and thus the falling-off rate was increased, and the moisture absorbtion rate was high. In addition the usability was impaired, for example, the bead shape was inferior or the arc stability was low. Furthermore, the arc-shielding property was so deteriorated that hydrogen was intruded from the welding atmosphere and hence the cracking resistance was reduced because of no substantial reduction of the diffusible hydrogen content.

Under the preparation conditions B3, the atmosphere was comprised solely of $CO_2$ and the dew point of the atmosphere was low, but the baking temperature was high. Therefore, the carbonate was decomposed and hence the falling-off rate and the moisture absorption rate became high. In addition, the usability became inferior. Furthermore, the diffusible hydrogen content was high and the cracking resistance was low.

Under the preparation conditions B4, since the atmosphere was comprised solely of air and the baking temperature was high, the carbonate was decomposed and hence the falling-off rate and the moisture absorption rate were increased, and the usability was impaired. Furthermore, since the arc-shielding property was deteriorated by the decomposition of the carbonate, and further since the dew point of the atmosphere was high, the OH groups were formed in the covering and the diffusible hydrogen content of the weld metal became higher than that of the weld metal welded with the electrode prepared according to the conventional process, thus, the cracking resistance was inferior.

Under the preparation conditions B5, for the same reasons as described above with respect to the preparation conditions B4, the carbonate was decomposed, and both the falling-off rate and the moisture absorption rate were increased. In addition, the usability became inferior. Since the dew point of the atmosphere was lower than under the preparation conditions B4, the diffusible hydrogen content was lower than that of the weld metal welded with the electrode prepared under the conditions B4. However, the low diffusible hydrogen content attached was not effective for the enhancement of cracking resistance.

In each of the electrodes a1, a2, a3, a4, a5 and a6, prepared by the process of the present invention, the total amount of fumes was smaller by at least 20% than the total amount of fumes in the comparative electrode b1 or b2.

Furthermore, from the foregoing results, it is seen that, in the electrodes containing an appropriate amount of Li, which were prepared according to the process of the present invention, the moisture absorption rate was lower than in the electrodes which were prepared according to the process of the present invention but did not contain Li.

In the foregoing Example, electrodes having a diameter of 4.0 mm were used, and the results obtained at the alternating current welding were illustrated. It was confirmed that similar results were obtained when the same electrodes were subjected to the direct current welding or when electrodes having a diameter of 3.2 mm or 5 mm were subjected to the direct current or alternating current welding.

As will be apparent from the foregoing description, according to the present invention, not only the diffusible hydrogen content in the weld metal but also the total amount of fumes and the moisture absorption rate can be reduced to levels much lower than in case of electrodes prepared according to the conventional process. Furthermore, the cracking resistance of weld metal at the identical strength level can remarkably be improved by the present invention. The electrode according to the present invention allows a welding procedure of structures of very thick steel plates to be realized in an environment with small amount of fumes and with any necessity to perform preheating.

It is apparent that the present invention will make great contributions to progress in various industries.

We claim:

1. A process for the production of a low hydrogen type covered arc-electrode, which comprises coating on a core wire a covering which contains $Na_2O$ and $K_2O$, at an $Na_2O/K_2O$ weight ratio of at least 1, together with a carbonate and baking the thus applied covering at a temperature of from 500° to 800° C. in an atmosphere containing at least 2% of carbon dioxide gas and having a dew point not more than 5° C., said carbon dioxide gas being derived from a source other than the decomposition of said carbonate, wherein said carbon dioxide-containing atmosphere protects the carbonate from decomposition, the carbonate remaining intact in the coating after said baking step has been terminated.

2. A process for the production of a low hydrogen type covered arc-electrode according to claim 1, wherein said covering further contains a lithium compound in an amount of 0.005 to 0.4% in terms of lithium.

3. A process for the production of a low hydrogen type covered arc-electrode according to claim 2, wherein the balance of said atmosphere is air.

4. A process for the production of a low hydrogen type covered arc-electrode according to claim 1 or 2, wherein prior to baking in said atmosphere at a temperature of from 500° to 800° C., said core wire coated with said covering is preliminarily heated to a temperature of from 100° to 350° C.

5. A process for the production of a low hydrogen type covered arc-electrode according to claim 1 or 2, wherein said baking temperature is from 500° to 600° C.

* * * * *